(12) United States Patent
Luick

(10) Patent No.: US 7,743,237 B2
(45) Date of Patent: Jun. 22, 2010

(54) REGISTER FILE BIT AND METHOD FOR FAST CONTEXT SWITCH

(75) Inventor: David Arnold Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 469 days.

(21) Appl. No.: 11/848,498

(22) Filed: Aug. 31, 2007

(65) Prior Publication Data

US 2007/0294515 A1    Dec. 20, 2007

Related U.S. Application Data

(63) Continuation of application No. 10/682,134, filed on Oct. 9, 2003, now Pat. No. 7,343,480.

(51) Int. Cl.
*G06F 9/00* (2006.01)
(52) U.S. Cl. .................... 712/228; 711/109
(58) Field of Classification Search ............ 712/228; 711/109
See application file for complete search history.

(56) References Cited

U.S. PATENT DOCUMENTS 6,314,510 B1 * 11/2001 Saulsbury et al. .......... 712/213
7,134,002 B2 * 11/2006 Shoemaker ................. 712/228

* cited by examiner

*Primary Examiner*—Niketa I Patel
*Assistant Examiner*—Benjamin P Geib
(74) *Attorney, Agent, or Firm*—Martin & Associates LLC; Bret J. Petersen

(57) ABSTRACT

A register file bit includes a primary latch and a secondary latch with a feedback path and a context switch mechanism that allows a fast context switch when execution changes from one thread to the next. A bit value for a second thread of execution is stored in the primary latch, then transferred to the secondary latch. The bit value for a first thread of execution is then written to the primary latch. When a context switch is needed (when the first thread stalls and the second thread needs to begin execution), the register file bit can perform a context switch from the first thread to the second thread in a single clock cycle. The register file bit contains a backup latch inside the register file itself so that minimal extra wire paths are needed to or from the existing register file.

7 Claims, 4 Drawing Sheets

US 7,743,237 B2

REGISTER FILE BIT AND METHOD FOR FAST CONTEXT SWITCH

CROSS-REFERENCE TO RELATED APPLICATION

This patent application is a continuation of a patent application of the same title, Ser. No. 10/682,134 filed Oct. 9, 2003, which is incorporated herein by reference.

BACKGROUND OF THE INVENTION

1. Technical Field

This invention generally relates to data processing, and more specifically relates to registers in a computer system.

2. Background Art

In modern computer systems, multithreading has been used to keep high frequency processors from being idle a majority of the time. In general, this is accomplished by allowing multiple threads to execute at once on a single physical processor. Each thread requires its own copy of the architected register file. Thus, in a processor architecture as shown in FIG. 1 with 32 general purpose registers, 32 floating-point registers, and 32-48 physical rename registers (required because of long latency pipelines), a two thread implementation would require one set of each registers per thread.

If a processor implements 2-way hardware multithreading, execution of the two threads is swapped on cache misses in an effort to keep the processor as busy as possible. Software multithreading is also known that allows multiple threads to issue and dispatch instructions simultaneously. Regardless of whether hardware or software multithreading is used, the use of two threads typically requires twice as many architected registers.

New multithreading schemes have been proposed with four or more threads extent at one time. Four threads require four sets of artichtected registers, as shown in FIG. 2. The number of registers in each groups is quadrupled to provide a separate set of registers for each of the four threads. Quadrupling the number of registers substantially increases read delay, results in a very large increase in power usage, and results in a substantial increase in integrated circuit real estate to implement the registers. These drawbacks are significant, and have hindered the development of multi-threaded systems that have more than two threads. Without an improved register file that avoids these drawbacks, the computer industry will continue to suffer from excessively expensive ways of providing more than two threads of execution in a computer system.

DISCLOSURE OF INVENTION

A register file bit includes a primary latch and a secondary latch with a feedback path and a context switch mechanism that allows a fast context switch when execution changes from one thread to the next. A bit value for a second thread of execution is stored in the primary latch, then transferred to the secondary latch. The bit value for a first thread of execution is then written to the primary latch. When a context switch is needed (when the first thread stalls and the second thread needs to begin execution), the register file bit can perform a context switch from the first thread to the second thread in a single clock cycle. The register file bit contains a backup latch inside the register file itself so that minimal extra wire paths are needed to or from the existing register file.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 3:
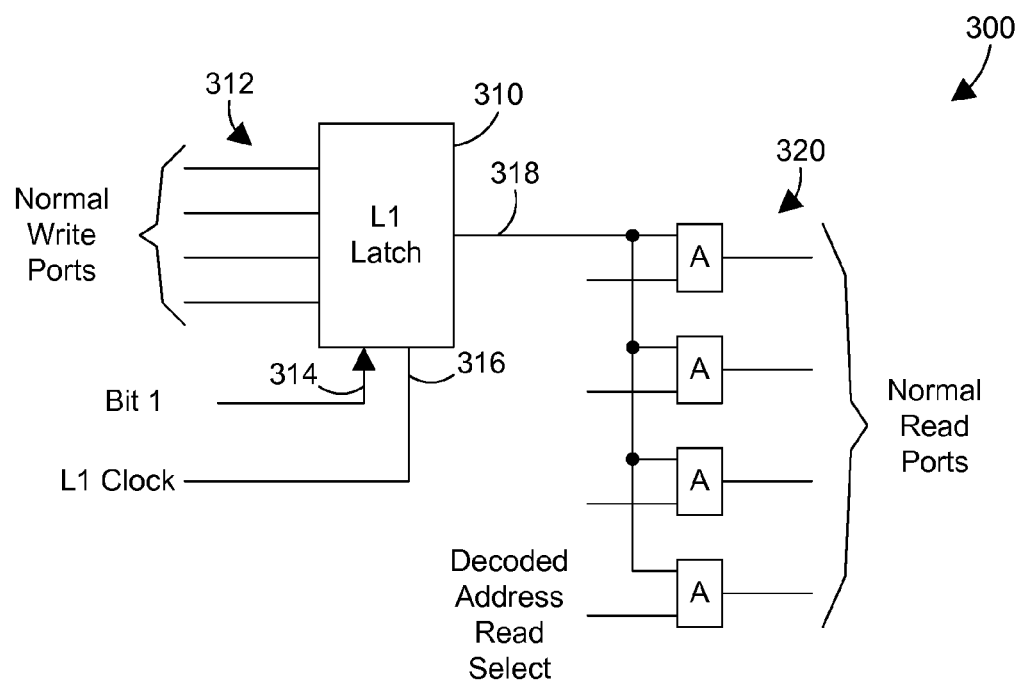
FIG. 3 is a block diagram of a prior art register file bit.

Referring to FIG. 3, a prior art register file bit 300 is shown to include a latch 310 that includes four data inputs (write ports) 312, a latch enable input 314, a clock signal input 316, and a data output 318. The data output 318 is coupled to four read ports 320. Each read port has a decoded address read select signal that enables the output.

In the prior art, the register file bit 300 would have to be replicated four times for a system that has four threads of execution. Replication register file bit 300 four time results in several undesirable consequences. First, the real estate required to implement the register file is four times as large. Because the read and write ports now go to four register bits instead of one, the loading of the lines may become so great that more than one clock cycle is required to perform reads from and writes to the registers. The power consumption in the register file will go up four times. For these reasons, quadrupling the number of registers to accommodate four threads of execution is not a desirable solution.

Figure 4:
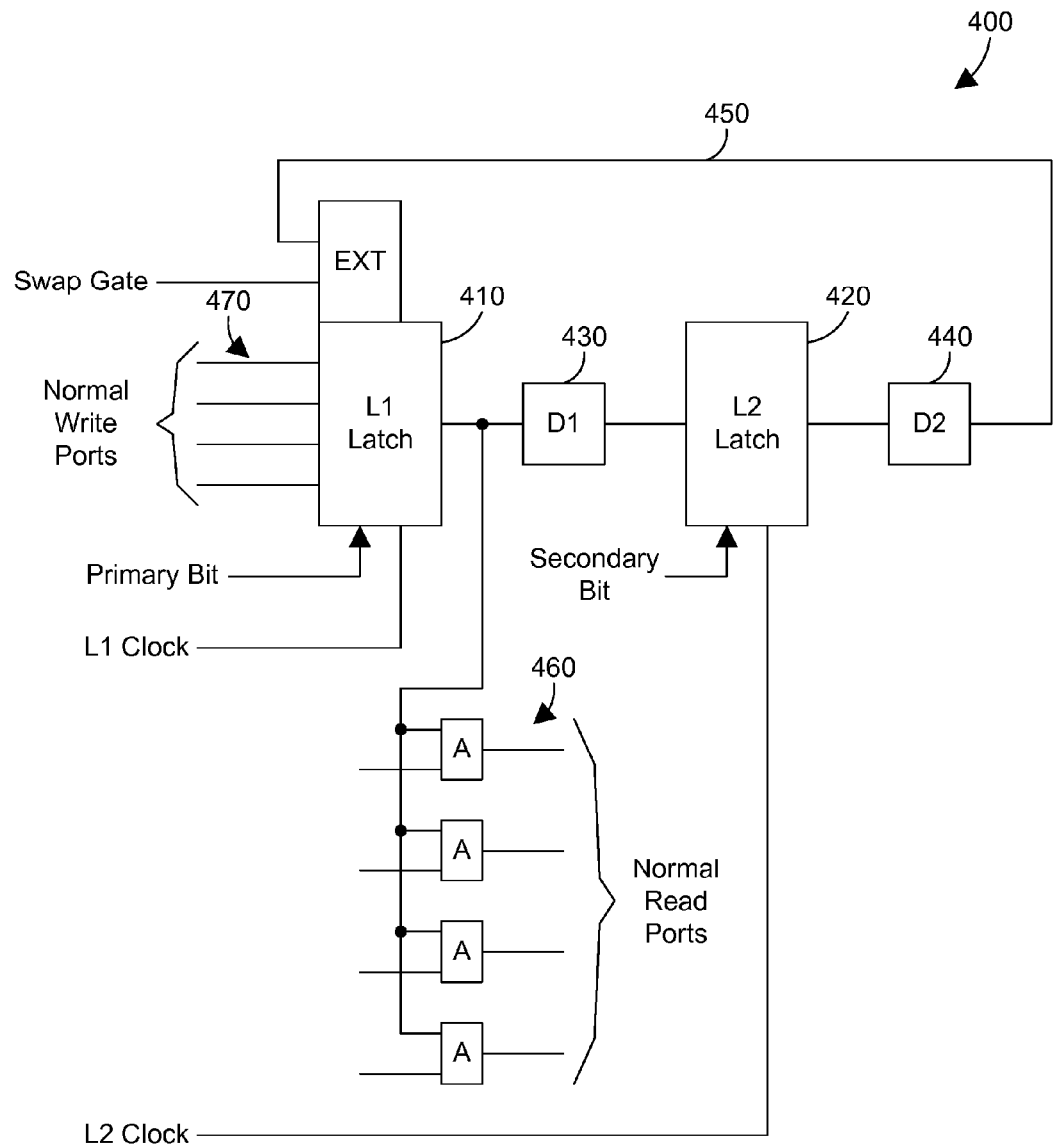
FIG. 4 is a block diagram of a register file bit in accordance with a first embodiment.

One specific implementation of a register file bit in accordance with the preferred embodiments is shown in FIG. 4. A register file bit 400 is ideally suited to hybrid multithreading, where four threads are allowed on a core at once, but only two of the threads may issue instructions at a time. Given this arrangement, only the two currently issuing threads need to actually read and write register files and their associated state at a time. This allows the four sets of registers to be organized in a unique way so that only half of them need to be in the access path at a time. The other two sets of registers can be kept in a backup latch inside the register file itself so as to not add extra wiring paths to or from the existing register file. This is very important as multiport register files are highly wire limited, i.e., their area is dictated by all the wire busses/ports required, not by the actual area of the transistors themselves.

The register file bit 400 allows access to the primary latch 410, but still provides a timely, power-efficient and area-efficient switch from a first thread to a second thread. The register file bit 400 is implemented as a cell with two latches 410 and 420, a feedback path 450 and a context switch mechanism that causes data stored in latch 410 to be transferred to latch 420, and that causes data stored in latch 420 to be transferred to latch 410. Latch 410 is the primary latch that contains the current primary thread data. Only the primary latch 410 may be read during processor execution via read ports 460, and may be written during processor execution via write ports 470. The secondary latch 420 is a very simple and inexpensive latch that contains the current backup thread data, and it is not accessible to read or write during processor execution. On initial startup of the hardware, the secondary thread bit value is written to the primary latch 410 first and then transferred to the secondary latch 420 one clock later. Then the primary thread bit value is written into the primary latch 410.

Two delay elements 430 and 440 are provided to assure data setup and hold times are satisfied for the latches 410 and 420. Delay element 430 assures the data hold time on the data input to the secondary latch 420 is satisfied. Delay element 440 assures the data hold time on the signal fed back via feedback path 450 to the primary latch 410 is satisfied. Delay elements 430 and 430 may be made up of a local capacitive line or circuit or may simply be an exclusive OR half latch known in the art.

Figure 1:
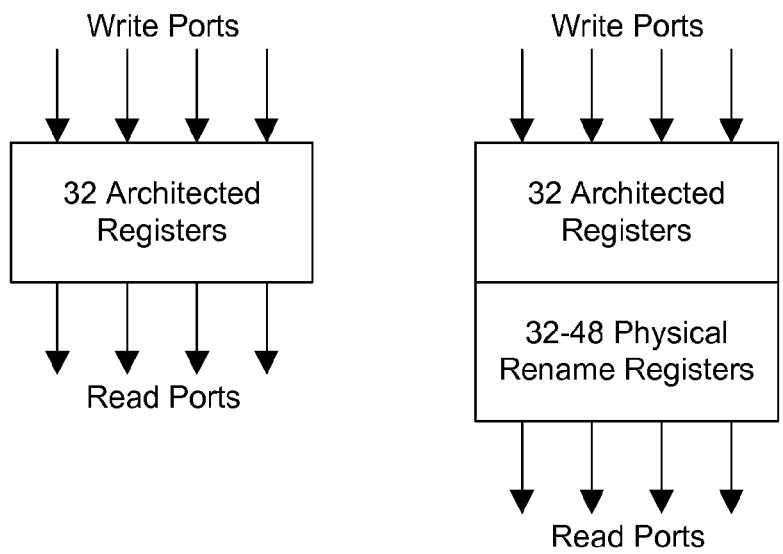
FIG. 1 is a block diagram of architected registers in a sample prior art computer system.
Figure 2:
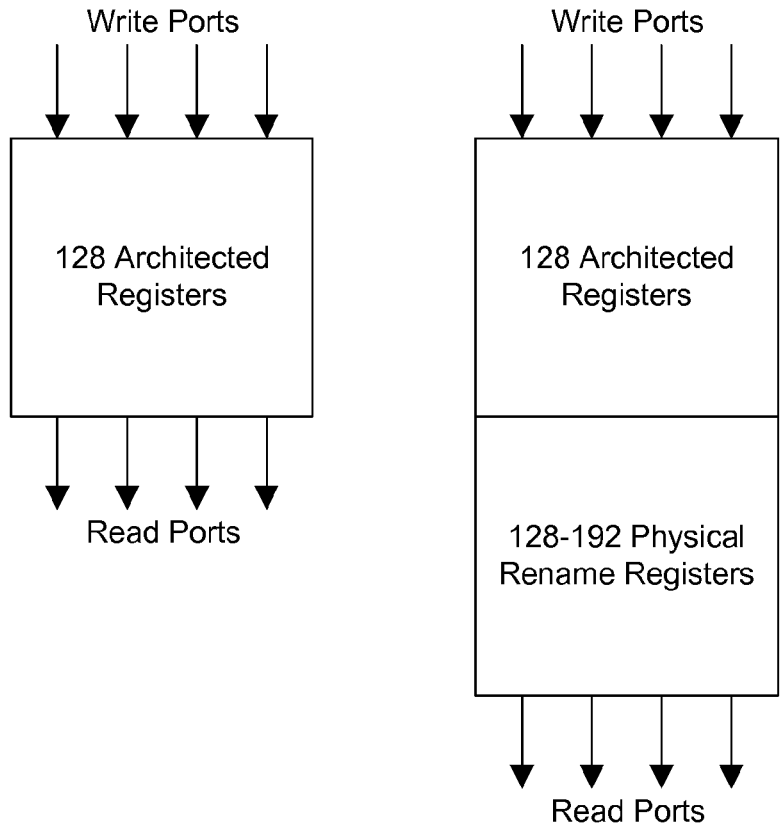
FIG. 2 is a block diagram showing the number of registers that would be required for the computer system in FIG. 1 to support four threads of execution in the prior art.

For a four-threaded system, instead of providing four different sets of registers, only two sets of registers are needed, because each register contains the non-issuing thread bit value in the secondary latch. Thus, instead of providing four distinct sets of registers as shown in FIG. 2, the invention provides two sets of registers implemented using the register file bit 400 of FIG. 4, with each register file bit containing the value for the currently-executing thread in its primary latch 410 and containing the value for the backup thread in its secondary latch 420.

When an event such as a cache miss occurs on the first thread and it is desired to begin executing the second thread, a very fast one-cycle thread swap can be initiated by simultaneously clocking the primary latch 410 and secondary latch 420 and by enabling the Swap Gate control input to of the primary latch 410. The only additional requirement is that the swap must occur at least one cycle after the last write of the primary latch 410. In operation, one cycle after a miss is detected and the currently-executing thread stalls, execution can resume from the backup thread assuming that the instruction buffers are implemented in a similar way as the register files so as to accomplish a one-cycle swap. Only one issue cycle is lost due to the swap in the general case where a load instruction has caused a cache miss.

Because the paths between primary register 410 and secondary register 420 are local intracell paths, no global wires are added to the register file other than a single global clock and global swap control line so that the area is very minimally impacted. In addition, because only half of the total registers are accessed at a time, the read and write access times are 20-30% faster than for the prior art implementation shown in FIG. 2, and the power consumed per read or write is 30-40% less, given dotted node sizes half as large when compared to the prior art implementation in FIG. 2. The total cell area by adding the secondary latch 420 and the two delay elements 430 and 440 grows the basic cell area by about 70%. This brings the silicon area of the register file nearly in line with, but still less than, the wiring area of the array. As a result, most of the real estate needed to implement the secondary latch 420 and the two delay elements 430 and 440 is real estate that is currently unused, because known register files are typically highly global wire-constrained. For example, a register file could be vertically wire-limited but horizontally device limited. In this event, one could simply choose to implement a wider cell with more devices to accommodate the additional latches, and only use local horizontal wire for those connections.

The register file bit of the preferred embodiments supports multiple threads that do not issue instructions at the same time. A secondary latch holds the bit value for the backup thread, while the primary latch holds the bit value for the currently-executing thread. When the currently-executing thread stalls (e.g., a cache miss occurs), the backup thread may be activated, and the values in the two latches are swapped in a single clock cycle. This single cycle swap provides a very fast context switch between threads. In addition, the implementation of the register file bit of the preferred embodiments allows the register file bit to be implemented in real estate that is mostly already present but unused in the register file.

Figure 5:
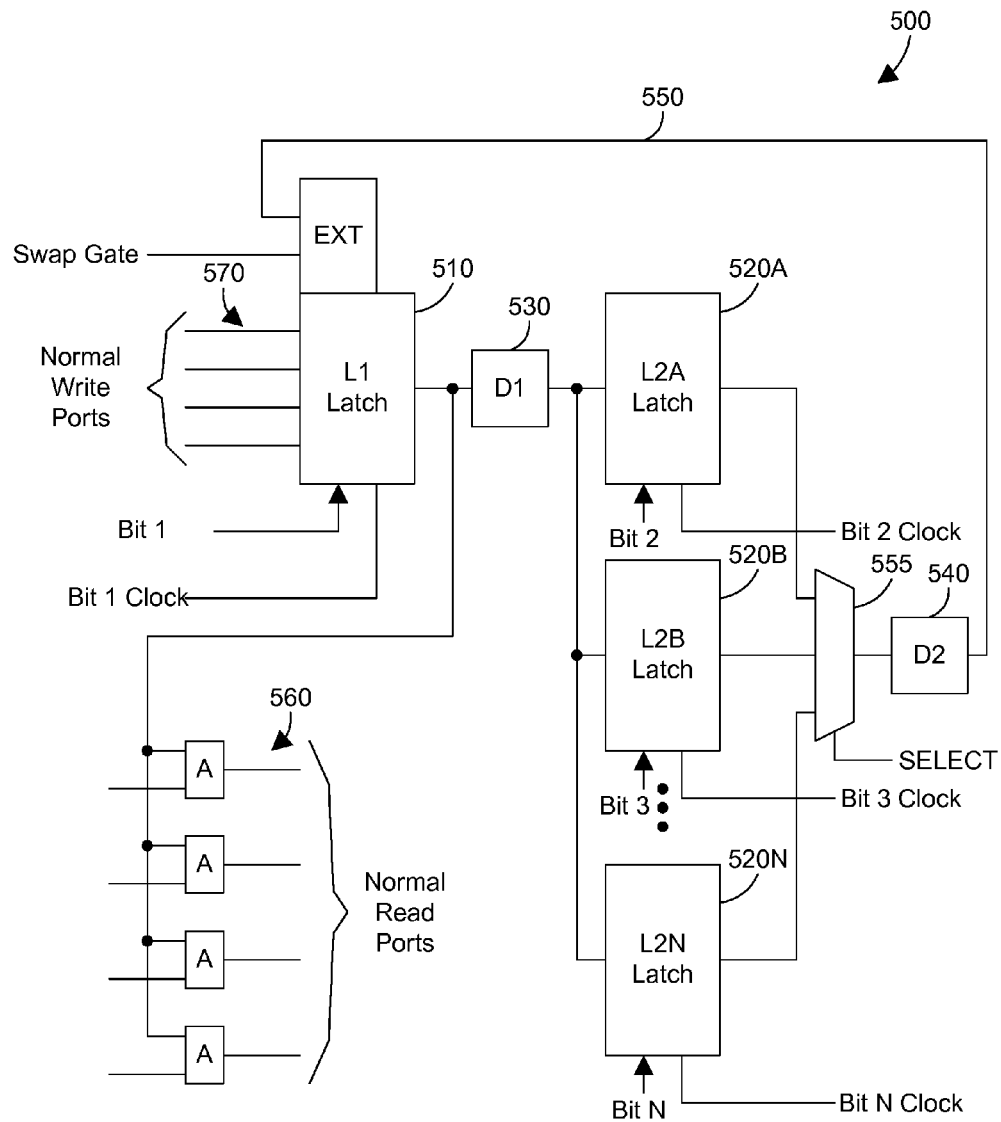
FIG. 5 is a block diagram of a register file bit in accordance with a second embodiment.

The specific example in FIG. 4 in accordance with the first embodiment shows the configuration for a register file bit 400 that has a single primary latch 410 and a single secondary latch 420. Referring now to FIG. 5, a register file bit 500 in accordance with the second embodiment may include multiple secondary latches that store the state for multiple backup threads. Thus, if a computer system has eight threads, but only two of those threads may issue at one time, two sets of register file bits could satisfy the eight threads, if each set included a primary latch and three secondary latches. One example of a register file bit that includes multiple secondary latches is shown as register file bit 500 of FIG. 5. Register file bit 500 includes a single primary latch 510 and multiple secondary latches 520 (shown in FIG. 5 as 520A, 520B . . . 520N). Delay elements 530 and 540 are present to assure data hold times on the latches are satisfied. Because there are multiple secondary latches 520, a selector 555 selects one of the secondary latch outputs to feed back via feedback path 550 to the data input of the primary latch 510. One or more SELECT signals on the selector 555 determine which of the secondary latch outputs are selected and thus applied to the second delay element 540.

When the currently executing thread stalls, one of the three backup threads is selected, and a swap is made between the primary latch and the selected secondary latch. The register file bit of the preferred embodiments thus supports context switching between more than two threads.

The register file bit of the preferred embodiments includes a primary latch, one or more secondary latches, a feedback path from the data output of the secondary latch(es) to the input of the primary latch, and a context switch mechanism that causes the data stored in the primary latch to be written to the secondary latch, and that causes the data stored in a selected secondary latch to be written to the primary latch. The context switch mechanism preferably performs the switch between latches in a single clock cycle, thereby creating a register file bit that can perform a very fast context switch.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An integrated processor circuit comprising:
an architectected register file for hardware multithreading comprising a register file bit that provides a fast context switch from a first thread to a second thread, the register file bit comprising:
a primary latch having a data input and a data output;
a plurality of secondary latches each having a data input and a data output;
a feedback path from the data output of the plurality of secondary latches to the data input of the first latch, the feedback path including a data selection mechanism for selecting one data output from the plurality of secondary latches to feed back to the data input of the first latch; and a context switch mechanism that causes the data on the data output of the primary latch to be written to a selected one of the plurality of secondary latches, and that causes the data on the data output of the selected one secondary latch to be written to the primary latch.

2. The integrated processor circuit of claim 1 wherein the context switch mechanism comprises a swap gate control input on the primary latch.

3. The integrated processor circuit of claim 1 wherein the context switch mechanism comprises a delay element between the data output of the primary latch and the data inputs of the plurality of secondary latches.

4. The integrated processor circuit of claim 1 wherein the context switch mechanism comprises a delay element in the feedback path.

5. The integrated processor circuit of claim 1 wherein the context switch mechanism comprises at least one clock signal that latches data on the data input of the primary latch to the data output of the primary latch and at least one clock signal that latches data on the data input of a secondary latch to the data output of the secondary latch.

6. The integrated processor circuit of claim 1 further comprising a plurality of write ports on the data input of the primary latch.

7. The integrated processor circuit of claim 1 further comprising a plurality of read ports on the data output of the primary latch.

* * * * *